Sept. 30, 1969 D. I. POMERANTZ ET AL 3,470,348

ANODIC BONDING OF LIQUID METALS TO INSULATORS

Filed April 18, 1966

INVENTORS
DANIEL I. POMERANTZ
GEORGE WALLIS
BY
Robert Tennis
ATTORNEY 3,470,348

ANODIC BONDING OF LIQUID METALS TO INSULATORS

Daniel I. Pomerantz and George Wallis, Lexington, Mass., assignors to P. R. Mallory and Co., Inc., Indianapolis, Ind., a corporation of Delaware Filed Apr. 18, 1966, Ser. No. 543,241
Int. Cl. H05b *3/16*
U.S. Cl. 219—117 5 Claims

ABSTRACT OF THE DISCLOSURE

A normally solid fusible metallic conductive material is bonded to an insulating material which the metal, in a molten condition normally will not wet. The materials, with the conductive material in a molten condition, are placed in contact and the insulator is heated to render it electrically conductive. A low density electric current is then passed from the molten conductive material to the solid insulator. The current is then interrupted and the metal cooled to solidification.

The present invention relates to the bonding of dissimilar materials and, more particularly, relates to a novel method of metallizing an insulating material.

The coating of insulators with metals which are normally non-wetting to form electrical contacts and the like is currently achieved by a variety of methods. These include evaporation of the metal, electrodes plating of the metal, chemical deposition of the metal, or fusion of the metal at high temperatures. Metals deposited by these methods can also be used as intermediate layers to which a second metal will adhere, such as, by soldering or fusing.

Another means of achieving a bond between the insulator and the non-wetting metal is to interpose an oxide layer therebetween.

An object of the present invention is to provide a novel and improved method of bonding a normally non-wetting metal to an insulating material.

It is another object of the present invention of provide a means of obtaining direct adhesion between the normally non-wetting metal and the insulating material.

It is a further object of the present invention to disclose a method of providing solder connections and the like to insulating materials, such as glass, eliminating the intermediate metallizing step currently used in the art.

The present invention in another of its aspects relates to novel features of the instrumentalities described herein for teaching the principal object of the invention, and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein, and wherein the scope of the invention is determined rather from the dependent claims.

For illustrative purposes, the invention will be considered in conjuncton with the accompanying drawings in which.

Generally speaking, the present invention provides a method for bonding various molten metals directly to various insulators wherein the metal is either non-wetting or poorly wetting with respect to the insulator.

In the present invention, the molten metal is placed in contact with the insulating material and a small electric current is passed therebetween for a short time, until a bond forms, with the metal as the positive element. The insulating material is heated until it is conductive. Where the insulator is Pyrex glass, the temperature range is from about 200° C. to about 700° C. The temperature range for soft glass and ceramics such as porcelain and the like is approximately the same. Where the insulator is quartz, the temperature range is between 500° C. and 1200° C. When a current having a density of typically 20 microamperes/mm.$^2$ for about 30 seconds is passed through the molten metal to the insulator, a bond is formed between the two materials.

The exact values of current density and time will vary depending upon the materials being bonded. However, in bonding a certain combination of materials, the current-time product will, in general, remain approximately constant. For example, in a particular case one microampere passing through the system for a relatively long period of time will produce the desired bond as will one milliampere flowing for about 0.6 second. The times will vary according to the current. Similarly, where a current of about 1 microampere would require passage of current for about 10 minutes, a current of 20 microamperes would require passage of current for about 30 seconds.

Figure 1:
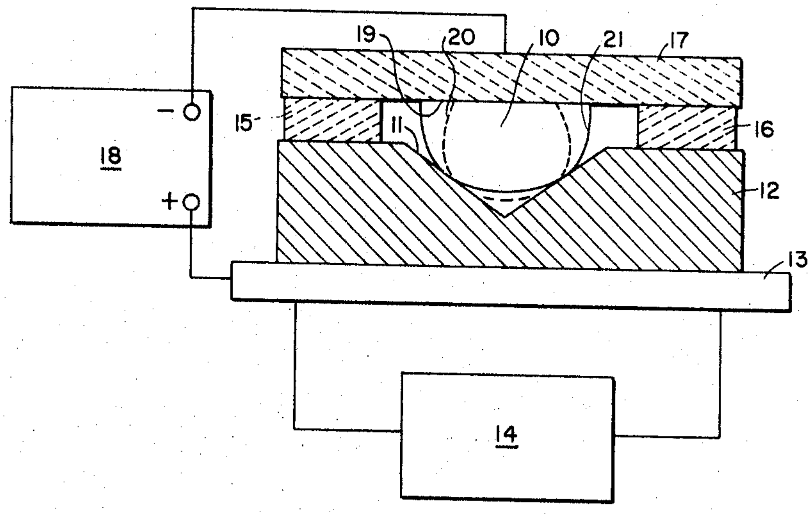
FIGURE 1 is a sectional view illustrating the apparatus for bonding molten lead to glass by passing a small electric current therebetween.

The bonding of molten lead to a glass surface provides a good example of the present invention. In FIGURE 1, the lead 10 was placed in a retaining means 11 of a conductive support means 12. The support means 12 is a material such as graphite or any other material which molten lead will not wet, but which will conduct heat and electric current. The support means 12 was placed adjacent to the heater means 13 which cooperates with the heater power supply 14. Insulating spacer means 15 and 16 were interposed between the support means 12 and the glass insulating member 17. The heater means 13 was activated until the lead 10 became molten and the glass insulating member 17 became slightly conductive at about 400° C. The bonding power supply 18 was activated and a current of about 300 microamperes was passed between the lead 10 and the glass insulating member 17 for about 30 seconds. During the passage of current, the molten lead drop was observed to spread out over the glass surface 19. The dotted line 20 represents the meniscus of the molten lead before bonding, and the solid line 21 represents the meniscus of the molten lead after bonding. The current was then interrupted, and the lead was cooled and solidified and found to adhere strongly to the glass. Without the passage of current between the lead and the glass, no increase of contact area was observed and adhesion therebetween was negligible.

Figure 2:
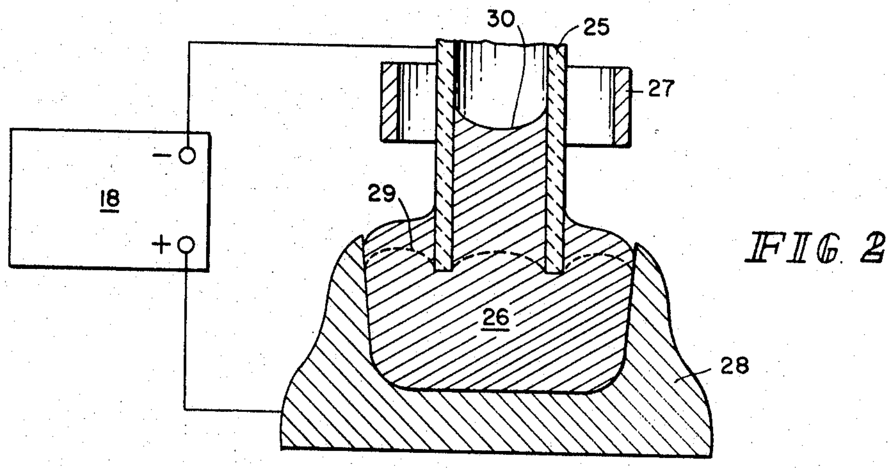
FIGURE 2 is a sectional view of the apparatus for and illustrative of the effect of tin coating a glass tube by passing a small electric current therebetween.

Referring to FIGURE 2, a heated glass tube 25 was immersed in a pool of molten tin 26. The glass tube 25 was heated to a temperature of about 400° C. by the heating means 27. The molten tin was retained by the reservoir means 28. The bonding power supply 18 was activated and a current of about 100 microamperes was passed from the tin into the glass for about 2 minutes. The current caused the molten tin to wet the glass and to rise within the tube for a distance of about ⅜ inch. The dotted line 29 represents the meniscus of the tin 26 prior to the passage of current therethrough, and the solid line 30 represents the meniscus after the passage of current and subsequent bonding. When the current was interrupted and the glass tube 25 removed from the pool of tin, the liquid tin did not flow out of the tube, indicating that a permanent bond had formed between the tin and the glass. Upon solidification, good adhesion between the tin and the glass was observed. Without the flow of current, the tin did not wet the glass, and when the tube was immersed in the molten tin and subsequently withdrawn, the tin flowed out of the tube.

The present invention has particular applicability wherein a bond is to be produced between a metal and an insulating member normally requiring an intermediate material which bonds to the insulating member and can be wetted by that particular metal, or wherein heat compression seals and the like must be produced. The present invention simplifies the usual prior art techniques.

Figure 3:
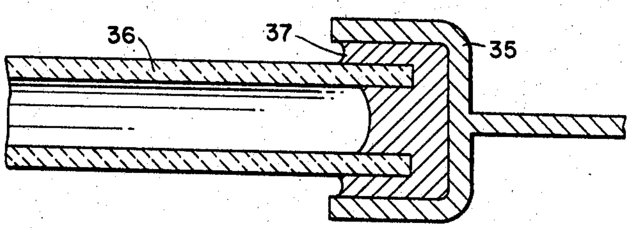
FIGURE 3 is a sectional view of an end cap for a glass tube produced by the present invention.

FIGURE 3 is illustrative of one of the many applications of the present invention, wherein an end cap 35 is sealed to a glass tube 36 by means of a molten solder layer 37.

A further use is the coating of insulators with metals which would normally be non-wetting such as the tinning of glass.

In addition to the tests conducted using tin and lead with glass, other metals and insulators were also tried and good results were obtained with aluminum, zinc, bismuth, tellurium, indium, silver and cadmium is conjunction with soft glass, borosilicate glass, quartz, sapphire and ceramic. It appears that many other metals and alloys in conjunction with many solid inorganic insulative materials are capable of being joined together hermetically by the process revealed by the present invention.

The embodiments illustrated and those described must not be construed as limiting in scope but rather as examples of devices and/or techniques within the purview of the claims made below.

Having described the invention fully, we claim:

1. A method of bonding an electrically insulative inorganic material having a normally high resistivity but being electrically conductive at elevated temperatures to an electrically conductive normally solid fusible metallic material, comprising the steps of: placing said conductive material in a molten condition and said insulative material in contact; heating said insulative material to obtain electrical conductivity; passing a positive electric current of low current density from said molten conductive material through said insulator material; and interrupting said current and cooling said materials so that said molten material solidifies.

2. As an article of manufacture, an electrically conductive metallic material and a solid inorganic insulative material having a normally high resistivity but being conductive at elevated temperatures, said materials being bonded together by the process of claim 1.

3. A method in accordance with claim 1 wherein said conductive material is selected from the group consisting of tin, lead, aluminum, zinc, tellurium, cadmium bismuth and indium.

4. A method in accordance with claim 1 wherein said electrically insulative material is selected from the group consisting of glass, quartz, sapphire and ceramic.

5. A method in accordance with claim 4 wherein said insulative material is heated to a temperature ranging from 300° C. to 1200° C. to render said insulative material conductive to electricity.

References Cited

UNITED STATES PATENTS

| | | | |
|---|---|---|---|
| 3,256,598 | 6/1966 | Kramer et al. | 29—484 |
| 3,397,278 | 8/1968 | Pomerantz | 29—472.9 |
| 3,417,459 | 12/1968 | Pomerantz et al. | 29—472.9 |
| 1,924,876 | 8/1933 | Morgan | 219—76 XR |
| 2,527,720 | 10/1950 | Guyer | 219—117 XR |

JOSEPH V. TRUHE, Primary Examiner

L. H. BENDER, Assistant Examiner

U.S. Cl. X.R.

219—76, 118